(12) United States Patent
Nilsen et al.

(10) Patent No.: US 6,378,608 B1
(45) Date of Patent: Apr. 30, 2002

(54) APPARATUS AND METHOD FOR SEPARATING OIL, WATER AND SOLIDS

(75) Inventors: Finn Patrick Nilsen, Nattland; Erik Nilsen, Laksevag, both of (NO)

(73) Assignee: Framo Engineering A.S., Sandsli (NO)

( * ) Notice: Subject to any disclaimer, the term of this patent is extended or adjusted under 35 U.S.C. 154(b) by 0 days.

(21) Appl. No.: 09/622,160

(22) PCT Filed: Feb. 12, 1999

(86) PCT No.: PCT/GB99/00439

§ 371 Date: Sep. 25, 2000

§ 102(e) Date: Sep. 25, 2000

(87) PCT Pub. No.: WO99/40992

PCT Pub. Date: Aug. 19, 1999

(30) Foreign Application Priority Data

Feb. 13, 1998 (GB) ................................... 9803183

(51) Int. Cl.⁷ ..................... E21B 43/38; E21B 43/40
(52) U.S. Cl. ................. 166/265; 166/243; 166/369; 210/512.2
(58) Field of Search ................ 166/265, 243, 166/369; 210/170, 512.2

(56) References Cited

U.S. PATENT DOCUMENTS

| 4,846,780 | A | | 7/1989 | Galloway et al. |
| 5,032,273 | A | * | 7/1991 | Senyard, Sr. et al. .... 210/494.2 |
| 5,711,374 | A | * | 1/1998 | Kjos ........................... 166/265 |
| 5,961,841 | A | * | 10/1999 | Bowers ....................... 210/739 |
| 5,996,690 | A | * | 12/1999 | Shaw et al. ............. 166/250.01 |
| 6,017,456 | A | * | 1/2000 | Kennedy et al. ......... 210/512.2 |
| 6,033,567 | A | * | 3/2000 | Lee et al. ................. 210/512.2 |
| 6,189,613 | B1 | * | 2/2001 | Chachula et al. ........... 166/265 |
| 6,213,208 | B1 | * | 4/2001 | Skilbeck ..................... 166/265 |

FOREIGN PATENT DOCUMENTS

| SU | 617046 | 7/1978 |
| WO | WO 97/11254 | 3/1997 |

* cited by examiner

*Primary Examiner*—Hoang Dang
(74) *Attorney, Agent, or Firm*—Young & Thompson

(57) ABSTRACT

An apparatus for separating water from an oil mixture extracted from a well that is adapted to be positioned downhole and that includes a hydrocyclone (6), an electrostatic coalescence unit (8), a centrifugal device (10), and a re-injection pump.

10 Claims, 2 Drawing Sheets

APPARATUS AND METHOD FOR SEPARATING OIL, WATER AND SOLIDS

BACKGROUND OF THE INVENTION

The present invention relates to an apparatus and method for separating water from an oil mixture extracted from a well.

When extracting oil from an oil reservoir using an on-shore or sub-sea oil well, the oil mixture extracted commonly contains contaminants such as sand and water. Traditionally the oil mixture is transported through the pipes of a well to a platform above sea level where the contaminants are separated from the oil.

U.S. Pat. No. 5,032,273 discloses an oil separator for removing oil from a flowing stream of waste fluid, the separator comprising a cylindrical separator body having a bore with a centre, and a plurality of vanes comprising a surface capable of coalescing oil particles traversing the bore in a spiral path.

In this apparatus, separation is based on laminar flow. This non-rotating apparatus is not suitable for location downhole, since it is difficult to achieve laminar flow with the limited dimensions available downhole.

U.S. Pat. No. 3,972,816 relates to an apparatus for extracting solids and oils from an effluent, the apparatus comprising filter trap means, centrifuge means, de-emulsifier means to create a mixture having two distinct phases and separator means to separate the two phases.

In this apparatus, separation is achieved by gravitational forces alone. Thus, this apparatus is not suitable for location downhole.

The amount of water in oil mixtures extracted using oil wells is measured in terms of 'watercut', which is the ratio of water flow rate to the total flow rate. Over time, as oil is removed from a reservoir, the proportion of water in the extracted oil mixture increases and the watercut increases from 0% to 9%, for example. This means that the pipes of the well have to transport increasingly large amounts of water to the platform for processing. This can, given the right pressure and temperature conditions, cause hydrates to form, which is a major problem. Large volumes of hydrate-inhibitors such as methanol are then required.

Sub-sea processing of an extracted oil mixture allows more efficient use of the pipes and a reduction in the use of methanol. By separating any contaminants from the oil downhole (which means in the well below sea level) the pipes can either transport an increased volume of oil to the platform or be reduced in size to allow more cost effective transport of the oil to the platform.

It is known to separate water from an oil mixture downhole using a hydrocyclone: these are static devices which require a pressure drop across the hydrocyclone unit to achieve separation. For the hydrocyclone to work effectively there should be no free gas and the extracted oil mixture should be water-continuous, meaning that the oil-phase is in the form of droplets within a continuous water-phase.

WO 97/11254 discloses a method of separating oil, water and sand in a production fluid from an oil well. The production fluid is fed through a downhole liquid/liquid hydrocyclone to remove oil. The remaining mixture of water and sand is fed to a downhole solid/liquid hydrocyclone to remove sand.

A problem with hydrocyclones is that they cannot adapt to the changing watercut of an oil well. The presence of a pressure drop is also disadvantageous.

SUMMARY OF THE INVENTION

The present invention seeks to overcome these problems by providing an improved apparatus and method for separating water from oil mixtures.

The word 'comprising' and other forms of the word 'comprising' used in the description and claims does not limit the invention claimed to exclude any variation or additions which are obvious to the person skilled in the art and which do not have a material effect upon the invention.

In accordance with the present invention there is provided an apparatus for separating water from an oil mixture extracted from a well, the apparatus being adapted to be positioned downhole and comprising means for separating out solids, means for causing coalescence and a centrifugal device, wherein the means for causing coalescence is arranged upstream of the centrifugal device, and is independent of the centrifugal device and the means for separating out solids.

The centrifugal device rotates in order to separate the water from the oil mixture. The speed of rotation may be varied, enabling the device to separate water from oil mixtures having different watercuts and fluid properties. The centrifugal device preferably has radial vanes to aid separation.

The centrifugal device may be controlled by means of active level measurement, automatic level measurement or by metering the oil in water content in the separated water.

The centrifugal device may be in accordance with the method and apparatus of U.S. Pat. No. 4,846,780, the apparatus of U.S. Pat. No. 5,575,615 and/or the apparatus and process of U.S. Pat. No. 5,624,371; the contents of these three US patents is hereby incorporated herein by reference.

The water may be a water-phase comprising matter which is soluble or partly soluble in water. The oil may be an oil-phase comprising matter which is soluble or partly soluble in oil.

For effective separation of water using the centrifugal device, the water preferably has a minimum droplet size of about 5 to 15 $\mu$m.

The apparatus is adapted to be positioned downhole so that it may be readily integrated with sub-sea level pipeline installations; it can be employed in both sub-sea and onshore downhole applications.

In use, any pressure drop across the apparatus is much lower and is generally insignificant in comparison to the pressure drop experienced in the use of hydrocyclones.

The apparatus may separate water from oil mixtures having watercuts ranging from 10 to 90%; it can therefore handle both water- and oil-continuous mixtures.

This invention allows reductions in pipe sizes or increased oil capacity for existing pipes. It also reduces the traditionally high costs associated with water-handling equipment above sea-level and reduces the amount of inhibitor which needs to be injected into the well to prevent the formation of hydrates.

The separated water is preferably returned to the same or adjacent oil reservoir; for example, it may be re-injected using a dynamic pump, while the separated oil is directed to the surface.

The means for causing coalescence may be an electrostatic coalescence device or suitable chemicals. This coalescence means is adapted to increase the size of liquid particles in the oil mixture. For example, water droplets dispersed in an oil phase pass through an electrostatic field which charges the water droplets and causes them to be attracted to each other and coalesce. The greater the water droplet size, the better the performance of the centrifugal device. The means for causing coalescence is preferably arranged downstream of the separating means and upstream of the centrifugal device.

Preferably the separating means is arranged within the apparatus upstream of any means for causing coalescence and the centrifugal device. In one example it is a sand trap which may comprise a hydrocyclone for separating solids from liquids. The separating means preferably operates over a watercut range of 0 to 90%.

The extracted oil mixture leaving the separating means is preferably substantially free from solid contaminants such as sand; preferably it is at least 99% free of solid contaminants. The separated solids may either be returned to the reservoir with the separated water or be transported, with the separated oil, to a platform above sea level.

In accordance with the present invention there is also provided a method for separating water from an-oil mixture extracted from a well, the method comprising the following steps:

a) extracting an oil mixture comprising oil and water from a reservoir;

b) separating any solids from the oil mixture downhole;

c) passing the oil mixture through an independent means for causing coalescence which is positioned downhole;

d) passing the oil mixture into a centrifugal device which is positioned downhole; and e) centrifuging the mixture for separating water from the oil mixture.

BRIEF DESCRIPTION OF THE DRAWINGS

An example of the apparatus and method of the invention will now be described to illustrate the invention with reference to the accompanying diagrammatic drawings, in which.

DESCRIPTION OF THE PREFERRED EMBODIMENTS

Figure 1:
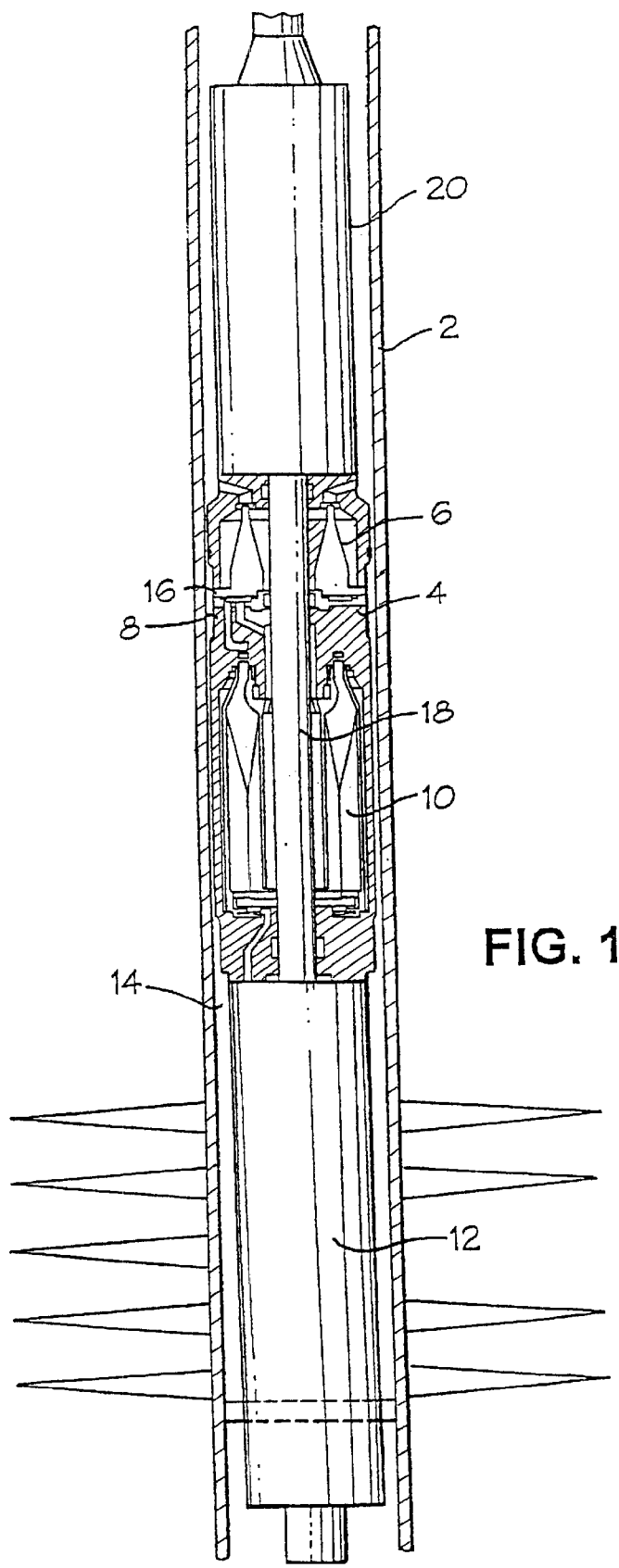
FIG. 1 is a longitudinal cross-sectional view of apparatus according to one embodiment of the invention, positioned within a well casing.
Figure 2:
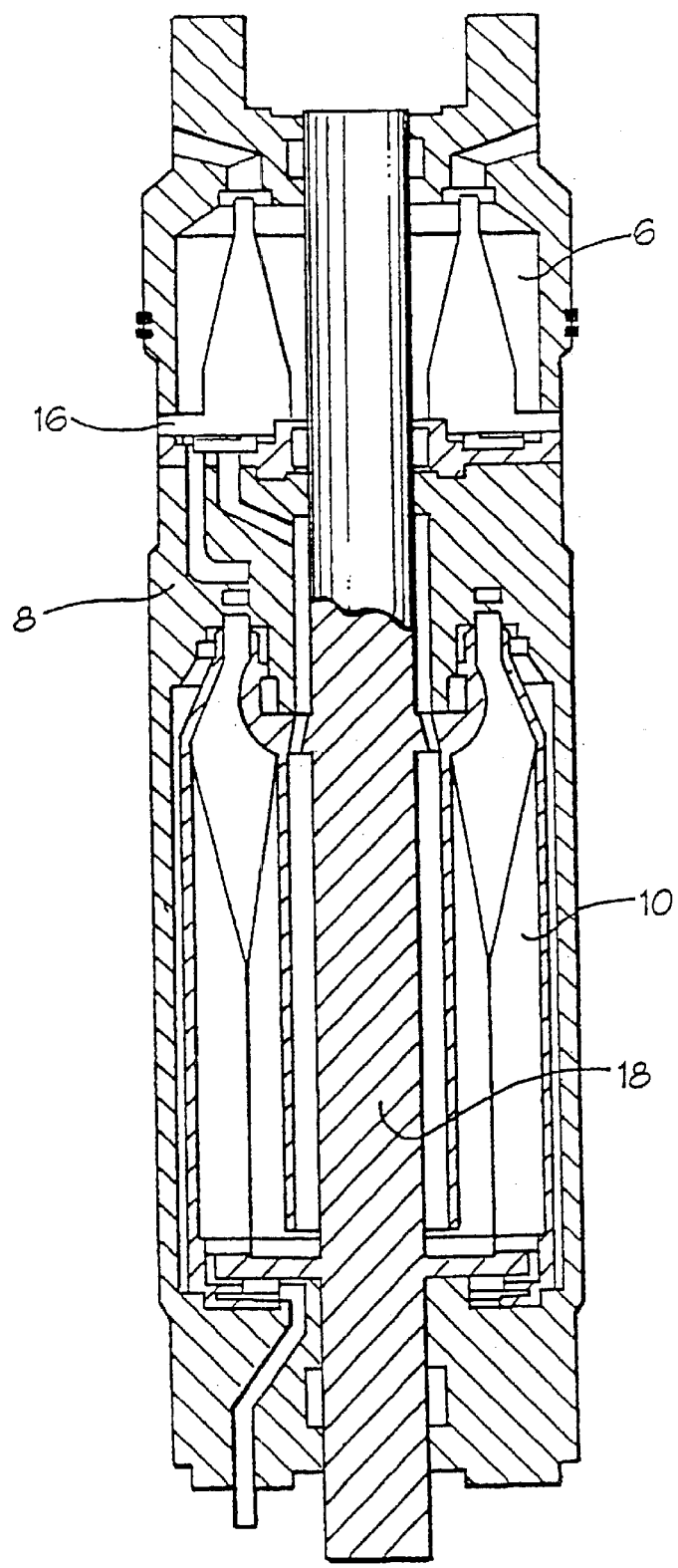
FIG. 2 is a longitudinal cross-sectional view of the main part of the apparatus shown in more detail.

With reference to FIGS. 1 and 2, within casing 2 of a well is an apparatus 4 containing a hydrocyclone 6, an electrostatic coalescence unit 8, a centrifugal separator 10, a re-injection pump 12, and a motor 20.

A mixture extracted from an oil reservoir is pumped through an annulus 14 between the well casing 2 and the apparatus 4. The mixture enters the apparatus 4 at an inlet 16 and passes into the hydrocyclone 6 which separates out, and retains in a trap, about 99% of any solid material contaminating the oil in the mixture. The mixture then passes through an electrostatic coalescence field provided by electrostatic unit 8. This charges water droplets dispersed in the oil phase and causes them to coalesce. The coalesced liquid particles pass into the centrifugal separator 10 which rotates about shaft 18 thereby separating out any water contaminating the oil. The water is directed to a pump 12 which returns it to the reservoir. The oil is pumped to a platform above sea level optionally via the trap of the hydrocyclone 6 to mix the oil with the trapped solid material.

What is claimed is:

1. An apparatus for separating water from an oil mixture extracted from a well, the apparatus being adapted to be positioned downhole and comprising:

means (6) for separating out solids from the oil mixture;

means (8) for causing coalescence of the water; and a centrifugal device (10) that separates the water from the oil mixture, wherein the means for causing coalescence is arranged upstream of the centrifugal device, and is independent of the centrifugal device and the means for separating out solids.

2. An apparatus as claimed in claim 1, wherein the means for separating out solids is arranged upstream of the centrifugal device.

3. An apparatus as claimed in claim 1, wherein the means for separating out solids is arranged upstream of the means for causing coalescence.

4. An apparatus as claimed in claim 1, wherein the means for separating out solids is a hydrocyclone.

5. An apparatus as claimed in claim 1, wherein the means for causing coalescence is an electrostatic coalescence unit.

6. An apparatus as claimed in claim 1, further comprising a re-injection pump (12) that directs the separated water into the well.

7. A method for separating water from an oil mixture extracted from a well, the method comprising the following steps:

a) extracting an oil mixture comprising oil and water from a reservoir;

b) separating any solids from the oil mixture downhole;

c) passing the oil mixture through an independent means for causing coalescence which is positioned downhole;

d) passing the oil mixture into a centrifugal device which is positioned downhole; and e) centrifuging the oil mixture for separating water from the oil mixture.

8. A method as claimed in claim 7, wherein, in step (c), the oil mixture is passed through an electrostatic field.

9. A method as claimed in claim 7, wherein the solids are separated using a hydrocyclone.

10. A method as claimed in claim 7, further comprising the following step:

f) returning the water to the reservoir;

wherein step f) follows step e).

* * * * *